Dec. 2, 1947.  J. R. SNYDER ET AL  2,431,836
REMOTE CONTROL MECHANISM
Filed March 11, 1944  3 Sheets-Sheet 1
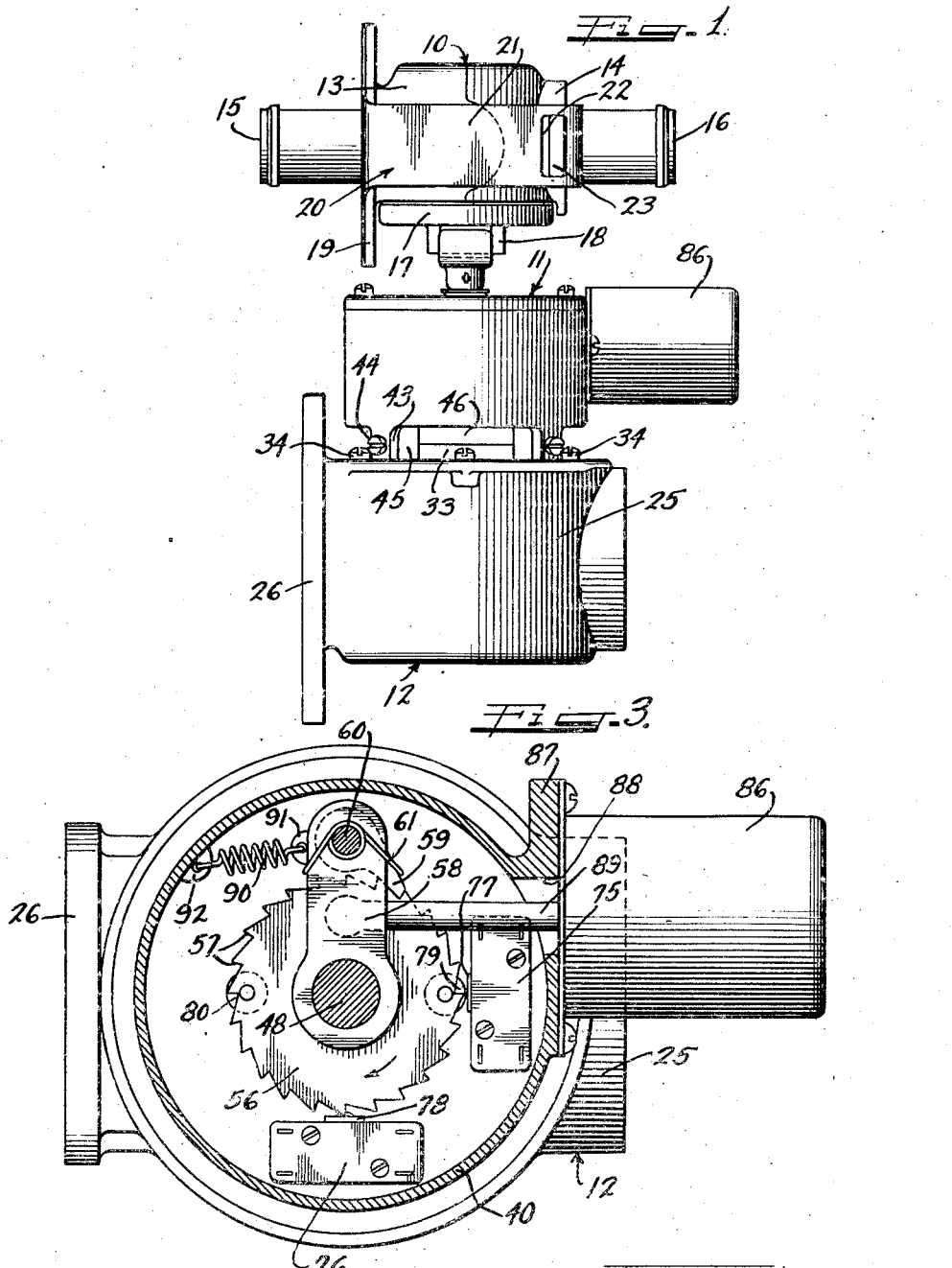
Inventors
JACOB RUSH SNYDER.
FREDERICK A. PEASE, JR.
by Charles H. Wells
Atty.

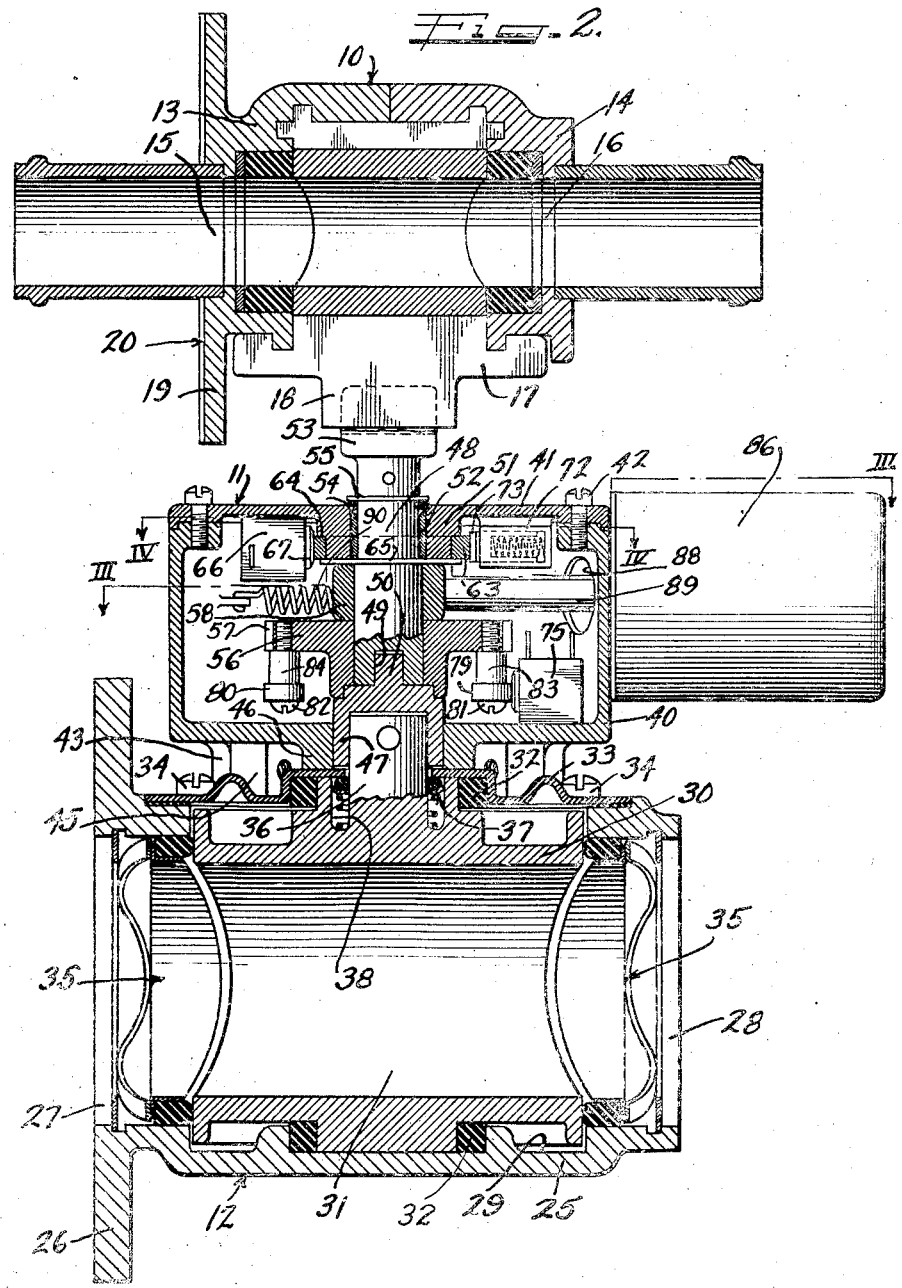

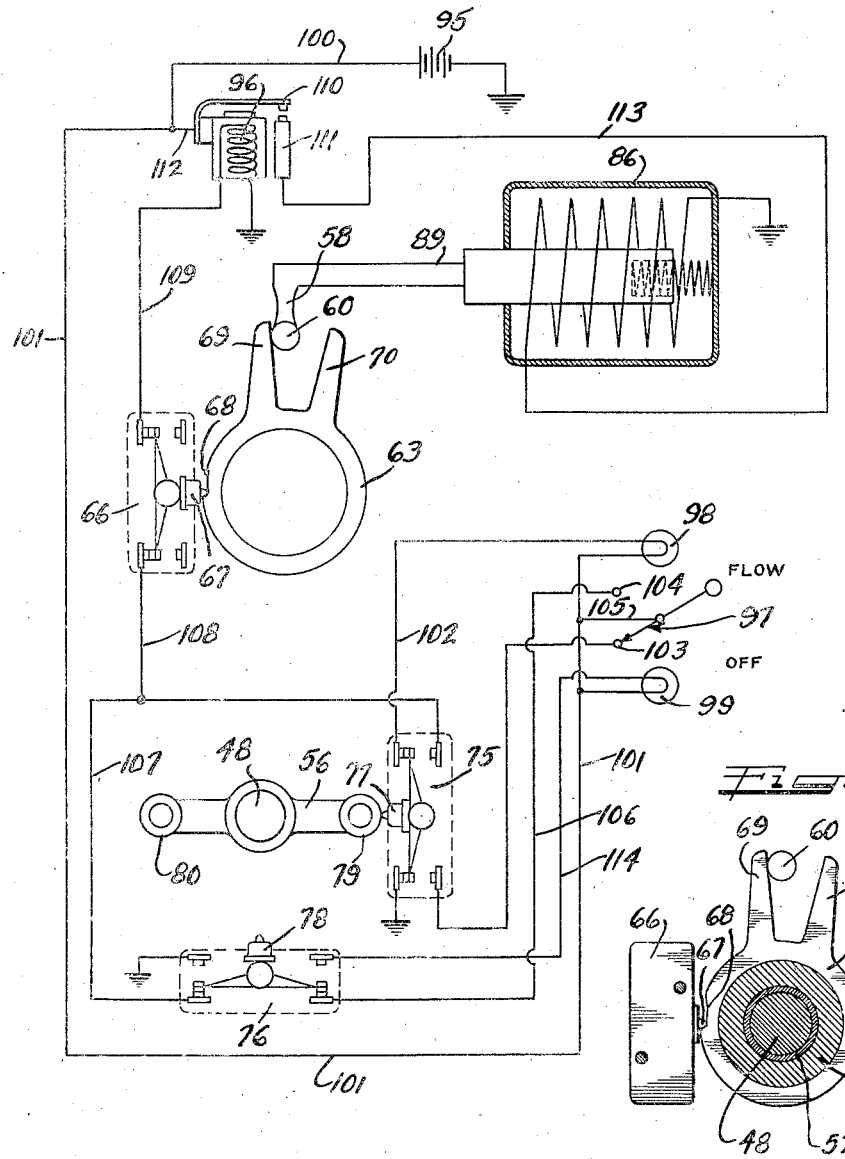

Patented Dec. 2, 1947

2,431,836

UNITED STATES PATENT OFFICE 2,431,836

REMOTE CONTROL MECHANISM

Jacob Rush Snyder, Cleveland, and Frederick Atwood Pease, Jr., Chagrin Falls, Ohio, assignors to Thompson Products, Inc., Cleveland, Ohio, a corporation of Ohio Application March 11, 1944, Serial No. 526,072

2 Claims. (Cl. 171—97)

The present invention relates to fluid control systems and remote control mechanisms therefor. More particularly, the invention deals with a remote control mechanism for operating a plurality of fluid flow control devices for controlling the flow of fluid at a point remote from the operator.

The apparatus of the instant invention is particularly advantageously adapted to the control of fluid in a plurality of conduits. By way of example, the mechanism finds application in the controlling of the flow of fuel and lubricating medium through adjacent conduits interconnecting the storage or supply tanks with the engine or engines of an airplane.

In airplanes, particularly those of commercial or military type, it is especially desirable to instantaneously and contemporaneously cut off the flow of fuel and lubricant to the engines from their respective storage tanks in the event of a sudden emergency. This operation ordinarily requires the manual actuation of several independent and individually operated shutoff devices which may often be disposed in widely separated parts of the plane.

In the event of a fire in or near the engines or other similar parts of an airplane, for instance, the flow of fuel and lubricating media, both of which are highly inflammable, to these parts of the apparatus, must be cut off at least until the fire is brought under control to prevent more serious consequences. It is also advantageous in the case of an imminent forced landing, to immediately cut off the flow of the fuel and lubricant from their respective supply tanks to minimize as much as possible the outbreak of fire in the case that the plane should crash.

The instantaneous control of such fluid systems may advantageously be accomplished by the apparatus of the present invention. The automatic operation of a plurality of fluid flow control devices is achieved by the manual adjustment of a simple control switch or the like which energizes a power operated actuating means for shifting the devices to their off position.

It is, therefore, an object of the present invention to provide a plurality of fluid flow control devices in combination with a power operated actuating means for automatically shifting the fluid flow control devices.

It is a further object of the present invention to provide a combination of shut-off valves and a manually operated control therefor of which the latter is disposed at a point remote from the other elements of the apparatus.

Another and further feature of the present invention is to provide a mechanism embodying one or more quick disconnect coupling units, one or more shut-off valves and an automatically operated shifting means for actuating both devices contemporaneously.

Other objects and features of the present invention will be apparent from the following description of one of the preferred embodiments of the invention.

For the sake of clearness but in no sense in limitation, the invention will be described hereinafter in this application as embodied in an automatically controlled quick disconnect coupling and a shut-off cock, such as would be employed in controlling the flow and disassembly of a pair of supply conduits such, for example, as a lubricant line and a gasoline line from the respective supply tanks to the engine of an airplane.

On the drawings:

Figure 1 is an elevation of an assembly embodying the principles of the present invention and combining a quick disconnect coupling and a shut-off valve with an automatically operated shifting mechanism therefor;

Figure 2 is a vertical cross-section through the assembly of Figure 1 with parts in elevation and broken away;

Figure 3 is a horizontal cross-section taken along the line III—III in Figure 2;

Figure 4 represents a partial cross-section with parts omitted taken along the line IV—IV in Figure 2; and Figure 5 is a diagrammatic representation of a typical wiring diagram illustrating the method of operation of the assembly of Figures 1 to 4, inclusive.

As shown on the drawings:

In Figures 1 and 2, is illustrated one form of structure embodying the principles of the present invention. The mechanism comprises a quick disconnect coupling 10, an actuating means 11 and a shut-off cock 12.

The quick disconnect coupling 10 which may take any suitable form comprises a pair of coupling boxes 13 and 14 which are provided with ports 15 and 16, respectively, therein adapted to receive suitable conduits for connection therewith. The coupling boxes 13 and 14 are adapted to mate together to form a casing open at one end thereof and to receive a split plug member 17 made up of a pair of cooperating portions only one of which is illustrated in Figure 2 and defines a passageway for interconnecting the ports 15 and 16 in the coupling boxes 13 and 14, respectively. The parts of the plug member 17 cooperate with the coupling boxes 13 and 14 to lock the same together in fluid flow communication from the port 15 to the port 16 of said boxes and are rotatable therein to a position in which they are adapted to disengage the coupling boxes but are nevertheless retained therein so as to seal each of said ports against leakage of the fluid therefrom.

The plug member 17 has a boss portion 18 thereon to accommodate a shifting member or wrench for rotating said plug with respect to the coupling boxes 13 and 14. The coupling box 13 may, if desired, be provided with a mounting flange 19 thereon by means of which it may be mounted upon a fire wall or panel of the engine cowling such, for example, as that employed in an airplane or the like. A clip 20, a portion of which extends across the mounting flange 19 so as to encircle the inlet 15 therein, has a pair of spring legs 21 (see Figure 1) which extend along opposite sides of the casing formed by the mated coupling boxes 13 and 14 to receive and retain in the apertures 22 therein, the latching bosses 23 provided on the coupling box 14. The clip 20 prevents the inadvertent disengagement of the coupling boxes 13 and 14 upon the shifting of the plug member 17 to sealing position with respect thereto, holding the parts together until such time as it is desired to disassemble them.

The shut-off cock 12, as will be apparent from Figure 2, embodies a housing 25 having a mounting flange 26 formed thereon and a pair of oppositely disposed ports 27 and 28 therein. The ports 27 and 28 are adapted to receive suitable fluid conduits connected thereto for the transmission of fluid through the device. The housing 25 has a generally cylindrically shaped chamber 29 in which the plug member 30 of corresponding shape and having a diametrically disposed passageway 31 extending therethrough for interconnecting the ports 27 and 28 in said housing is disposed in spaced rotatable relation therein being supported by a pair of bearings 32 of which one is retained in the cover member 33 secured to the housing 25 as by means of screws 34.

Suitable sealing means, such, for example, as the sealing assemblies 35 which are resiliently mounted in the ports 27 and 28 of the housing 25 serve to contact the outer periphery of the plugs 30 and to close the space between said plug and the inner wall of the chamber 29 to prevent the passage of fluid therebetween. The cover 33 is centrally apertured to permit the stem portion 36, which may advantageously be formed integrally with the plug 30, to project therethrough for engagement with a shifting means, such, for example, as the actuating means 11. A suitable packing or sealing means 37 surrounding the stem portion 36 and resiliently mounted in the annular groove 38 formed in the plug 30 about the base of said stem portion 36 may be provided to prevent leakage of fluid from the chamber 29 through the aperture in the cover member 33.

The actuating means 11 comprises a casing 40 to which a cover 41 is secured by a plurality of screws 42. The casing 40 of the actuating means 11 has a plurality of feet 43 secured as by means of screws 44 threaded to a like number of vertically extending bosses 45 formed on the housing 25 of the shut-off cock 12. A boss portion 46 projects downwardly from the base of the casing 40 and serves as a bearing means for an adapter 47 which is operatively secured to the stem portion 36 of the plug 30 for the shut-off cock 12. A vertical shaft 48 is disposed in substantially concentric relation with respect to the outer wall of the casing 40 of the actuating means 11 and is provided with a slot 49 which engages a tongue 50 on the adapter 47 for the actuation of the plug 30 of the shut-off cock 12.

The vertical shaft 48 projects through an apertured depending boss portion 51 formed on the under side of the cover member 41 being rotatably disposed in a bearing 52 which is press fit or otherwise suitably secured in the aperture of the boss portion 51. A slotted key 53 is secured in any suitable fashion to the end of the vertical shaft 48 projecting through the cover 41 and is adapted to engage the boss 18 formed on the split plug member 17 for the quick disconnect coupling 10. A suitable packing ring 54 mounted about the end of the vertical shaft 48 and disposed adjacent the end of the bearing 52 held in place by a suitable washer 55 adjacent the shank portion of the key 53 may be provided to seal the casing 40 against the admission of fluid being handled by the control mechanism thereby preventing the possibility of fire resulting from ignition of highly volatile fluids by sparks from the electrical equipment housed in said casing.

A ratchet wheel 56 having a serrated periphery embodying a plurality of teeth 57 is mounted upon and secured to the vertical shaft 48 being bottomed against the upper end of the adapter 47. An arm 58 is swingably mounted about the vertical shaft 48 and supported by the ratchet wheel 56. The arm 58, as will be noted from Figure 3, carries a pawl 59 rotatably mounted about a pin 60 projecting through the arm 58 adjacent the free end thereof. The pawl 59 is constantly urged against the periphery of the ratchet wheel 56, so as to be in position to engage the teeth 57 thereon, as by means of a looped spring 61 held in place by means of the pin 60. The depending boss portion 51 formed on the under side of the cover member 41 for the casing 40 has a cam member 63 rotatably mounted thereabout and held in place against a shoulder 64 formed thereon as by means of a washer 65 which is bottomed upon the arm 58 and disposed about the vertical shaft 48.

A suitable power control means such, for example, as a transfer switch 66 of the type embodying a spring contact member which is biased into engagement with one of two sets of contacts and shiftable toward the other of said sets of contacts by means of a spring-backed nib 67 is adapted to make and break an electrical circuit into which it is connected. The switch 66 is secured to the under side of the cover 41 of the casing 40 adjacent the cam member 63 in such fashion that the nib 67 thereof which serves to operate the switch to open and close the circuit therethrough will contact the outer periphery of said cam member 63.

The switch 66 is maintained open as long as the nib 67 is depressed by contact with the generally circular portion of the periphery of the cam member 63. The switch 66 is closed, however, when nib 67 registers with a notch 68 formed in the periphery of the cam member upon the shiftable movement thereof. The extent of the rotation of the cam member 63 is limited by contact of the prongs 69 and 70 formed on the periphery thereof with the pin 60 which projects upwardly from the arm 58 (see Figure 4).

As indicated in Figures 2 and 4, a suitable form of braking means 72 may be provided to limit to a certain extent the freedom of rotation of the cam member 63 except to the extent required, to conform with the movement of the pin 60 in contacting the prongs 69 and 70 thereof. The braking means 72 may be secured in any suitable fashion to the under side of the cover 41 of the casing 40 and may advantageously be provided with a shoe 73 having an arcuately shaped face for contact with the generally circular periphery of the cam member 63 being urged thereagainst as by means of a compression spring 74 inserted in the body of the braking means 72.

A pair of transfer switches 75 and 76, similar to the switch 66 associated with the cam member 63, is suitably secured to the base of the casing 40 in the arrangement indicated in Figure 3 of the drawings. The switches 75 and 76 are provided with shiftable nibs 77 and 78, respectively, which are so disposed that they will be operatively engaged by one or the other of a pair of rollers 79 and 80 which are supported from the under side of the ratchet wheel 56 at points dismetrically opposite each other with respect to the vertical shaft 48. The rollers 79 and 80 are rotatably mounted about bolts 81 and 82, respectively, which are threaded into the ratchet wheel 56 and are spaced from the under face of said ratchet wheel as by means of the spacers 83 and 84, respectively, (as shown in Figure 2). It will be apparent from Figure 3 that one or the other of the rollers 79, 80 will contact and depress the nibs 77 and 78 of switches 75 and 76, respectively, to actuate the same at each interval of 90 degrees in each complete rotation of the ratchet wheel 56.

A solenoid 86 is mounted in any suitable fashion upon the flanged portion 87 of the casing 40 which surrounds an aperture 88 in the wall thereof. An extension 89 provided upon the reciprocable core of the solenoid 86 projects through the aperture 88 for operative connection to the arm 58. With the several parts of the apparatus disposed in their relationship in Figure 3, the solenoid 86 is deenergized and the swingably mounted arm 58 is positioned with the pawl 59 thereon in contact with one of the teeth 57 of the ratchet wheel 56. The arm 58 is retained in the position illustrated by a spring 90, one end of which is secured in a projection 91 formed on the arm 58 and the other end of which is secured to an abutment 92 formed on the inner wall of the casing 40. As the solenoid 86 is energized, the core thereof and its extension 89 is shifted toward the right as seen in Figure 3, causing the arm 58 to be rotated about the vertical shaft 48 against the action of the spring 90.

This action of the solenoid 86 in the movement of the arm 58 causes the pivotally mounted pawl 59 in contact with one of the teeth 57 of the ratchet wheel 56 to move the ratchet wheel through an arc substantially equal to the overall length of one of the teeth 57. Upon deenergization of the solenoid 86, the extension 89 is released and is shifted toward the left as seen in Figure 3 while the spring 90 causes the arm 58 to return again to the illustrated position. During this retracting movement, the spring 61 urging the pawl 59 against the periphery of the ratchet wheel 56 causes it to engage the next tooth 57 further around on the periphery of the ratchet wheel so as to permit the mechanism to repeat the previous operation upon the subsequent energization of the solenoid 86. This process is repeated until the shaft 48 has been rotated to the desired position.

To afford a better understanding of the operation of the control mechanism of the present invention, attention is directed to Figure 5 of the drawings which represents a diagrammatic showing of a typical wiring diagram in which the several elements of the apparatus are represented as being interconnected by suitable electrical conduits to be energized from a suitable source of power such, for example, as the battery 95. A suitable relay 96 may also be provided in the circuit to aid in the operation of the solenoid 86. Any convenient form of double pole switch such, for example, as a toggle switch 97 may be employed in opening and closing the circuit for controlling the operation of the actuating means 11 in shifting the associated fluid flow control devices to either "flow" or "off" position. The switch 97 may conveniently be mounted upon a suitable panel board or instrument panel of the apparatus with which a structure of the invention is to be associated at some point remote from the fluid flow control device.

With the parts of the structure in the position illustrated in Figures 2, 3 and 4, that is, with the plug member 17 disposed in fluid flow communication with inlets 15 and 16 of the quick disconnect coupling 10 and the plug 30 having its passageway 31 in registration with ports 27 and 28 in the housing 25 of the shut-off cock 12, a signalling device may advantageously be operated.

The signalling device, in this case, a tell-tale light 98, may conveniently be mounted on the instrument panel adjacent the toggle switch 97 and will be lighted when the quick disconnect coupling 10 and the selector cock 12 are open to the passage of fluid. The circuit for lighting the telltale light 98 passes from the battery 95 through conductors 100 and 101 to one side of the light 98 and from the other side thereof through conductor 102 and the innermost pair of contacts on the switch 75 which are closed to a suitable ground. The switch 75 is closed by virtue of the fact that the roller 79 on the ratchet wheel 56 is in registration with the nib 77 of said switch, depressing the same and interconnecting the innermost pair of contacts, as indicated in Figure 5.

Let us assume, by way of illustration, that is now desired, for some reason, to close the quick disconnect coupling 10 and the shut-off cock 12. To accomplish this, the toggle switch 97 is tripped and the indicator therefor positioned adjacent the word "off" as seen in Figure 5 while the pointer previously in contact with the fixed contact 103 is shifted to engage the contact 104 for said switch.

As a result of the shifting of the toggle switch 97, an electrical circuit is now completed from the battery 95 through conductors 100, 101, and 105, across the switch 97 and its contact 104 through the conductor 106 to the outer pair of contacts of the switch 76 which are closed by reason of the fact that the nib 78 thereof is in its extended position. The circuit is completed across the outer pair of contacts of the switch 76 through the conductors 107 and 108 to the outer pair of contacts of the switch 66 which are closed by reason of the fact that the nib 67 of this switch is in its extended position being in registration with the notch 68 on the periphery of the cam member 63. The circuit extends from the conductor 108 across the switch 66 through the outer pair of contacts thereof and conductor 109 to the grounded coil of the relay 96, thereby causing the movable contact arm 110 thereof to engage the fixed contact 111 of the relay.

The closing of the movable contact arm 110 with respect to the fixed contact 111 causes electrical current to pass from the battery 95 through conductors 100 and 112 across the relay to conductor 113 which energizes the coil of the solenoid 86. The energizing of solenoid 86 retracts the core thereof moving the same to the right as seen in Figure 5 and similarly shifting the extension 89, the arm 58 and the pin 60 until said pin contacts the prong 70 of the cam member 63. The shifting of the arm 58 simultaneously moves the pawl 59 and rotates the ratchet wheel 56 and shaft 48 through an arcuate path corresponding substantially to the length of one tooth 57. The contact of pin 60 with prong 70 of the cam member 63 also causes the latter to rotate sufficiently to permit the nib 67 of the transfer switch 66 to disengage itself from the notch 68 in the periphery of said cam member 63, thereby causing the switch 66 to be opened, breaking the circuit through the relay 96.

Immediately upon breaking the circuit to the relay 96, contact is broken between the movable contact arm 110 and the fixed contact 111 disconnecting the battery 95 from the solenoid 86 and deenergizing the same. As we have seen, the deenergization of the solenoid 86 releases the core thereof permitting the extension 89 and the arm 58 bearing the pin 60 to assume the positions shown in Figure 3. The shifting of the pin 60 out of contact with the prong 70 of the cam 63 and back against the prong 69 thereof, rotates the cam member 63 to an extent sufficient to permit the nib 67 of the switch 66 associated therewith to again come into registration with the notch 68 on the periphery of said cam member 63. The circuit energizing the relay 96 is once more completed through the outermost pair of contacts of the switch 66 and the solenoid 86 will be energized by the electrical current from the battery 95 as before.

As indicated above, the movement of the core of the solenoid 86 and the extension 89 thereon to the right, when the solenoid is energized, causes the arm 58 to be rotated about the vertical shaft 48 while the pawl 59 pivotally mounted thereon shifts the ratchet wheel 56 by reason of its engagement with one of the teeth 57 thereof. When the solenoid 86 is deenergized and the extension 89 is released, the pawl 59 is retracted by arm 58 and engages the next tooth 57 on the ratchet wheel 56 in readiness to repeat the procedure of shifting the ratchet wheel as the solenoid is again energized through the functioning of the switch 66.

The structure, therefore, takes the form of a stepping motor and operates through the cooperative relationship of the pawl 59 and the ratchet wheel 56 to rotate the shaft 48 until the roller 79 on said ratchet wheel 56 contacts the nib 78 for the switch 76. When this position of the ratchet wheel 56 is attained, the switch 76 will be opened, breaking the circuit therethrough and closing the innermost pair of contacts thereof so as to light the tell-tale light 99 associated with the off position of the toggle switch 97. The lighting of the tell-tale light 99 indicates to the operator that the plug member 17 of the quick disconnect coupling 10 is in closed position preventing the flow of fluid therethrough, the plug member 30 of the shut-off cock 12 being contemporaneously positioned with its passageway 31 at right angles to the ports 27 and 28 in the housing 25 so as to cut off the flow of fluid therethrough.

The circuit from the battery 95 for lighting the tell-tale light 99 is completed through conductors 100, and 101 to one side of the light 99. The circuit extends from the other side of light 99 through a conductor 114 and across the innermost contacts of the switch 76 to the ground. The innermost contacts of switch 76 are now closed by reason of the contact of the roller 79 with the nib 78 inasmuch as the ratchet wheel 56 has been rotated through an arc of 90° by the action of the pawl 59 previously described.

It will be understood that the rotation of the ratchet wheel 56 which causes the roller 79 thereon to register with the nib 78 of the switch 76 moves the roller 80 disposed diametrically opposite the roller 79 on ratchet wheel 56 to a position adjacent the free end of the arm 58. Since the ratchet wheel only rotates in a clockwise direction, the roller 80 will come into contact with the nib 77 of the switch 75 on the next operation of the switch 97. When the operator next actuates the toggle switch 97 so as to shift it back to flow position, illustrated in Figure 5 of the drawings, and in contact with its fixed contact 103, a series of operations similar to those hereinbefore described will take place.

The switch 75, has its outer contacts closed by reason of the disengagement of the nib 77 from contact with the roller 79 due to the rotation of ratchet wheel 56 by the previously described operations. As the ratchet wheel 56 is rotated by the next operation of the apparatus, the roller 80 contacts the nib 77 of the switch 75, after the ratchet wheel has been rotated by the pawl 59 through an arc of 90 degrees. Thus, the nib 77 is again depressed closing the innermost contacts of the switch 75 and lighting the light 98 in the manner previously described.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. In a control system, a device to be controlled having a member rotatable between two 90° displaced positions, electric means for unidirectionally rotating said rotatable member, a primary control means comprising a manually operable switch having two circuit closing positions respectively corresponding to said operating positions of said rotatable member, a pair of 180° displaced cam members rotatable with said rotatable member, a pair of normally closed, cam operable switches displaced 90° from each other and arranged to be successively actuated to an open position by said rotating cam members, whereby only one of said cam operable switches is open at any one time, and circuit means for energizing said electric means in either position of said primary control means through one or the other of said cam operable switches respectively, said cam members being arranged to engage one of said switches at each of said operating positions of said rotatable member, whereby selective operation of said primary control means produces a rotation of said rotatable member from one to the other of its operating positions.

2. In a control system, a device to be controlled having a member rotatable between two 90° displaced positions, electric means for unidirectionally rotating said rotatable member, primary control means comprising a manually operated switch having a pair of contacts adapted to be selectively connected to a power source by operation of said switch, said contacts corresponding respectively to said operating positions of said rotating member, a pair of 180° displaced cam members rotatable with said rotatable member, a pair of normally closed cam operable switches displaced 90° from each other and arranged to be successively actuated to open position by said rotating cam members whereby only one of said cam operable switches is open at any one time, said cam members being arranged to engage one of said switches at each of said operating positions of said rotatable member, and a series connection between each of said contacts and said electric means respectively, including that one of said cam operable switches which is open when said rotatable member is in its operating position corresponding to the position of said primary control means energizing the respective contacts, whereby the selective operation of said primary control means produces rotation of said rotatable member from one to the other of its operating positions.

JACOB RUSH SNYDER.
FREDERICK ATWOOD PEASE, Jr.

REFERENCES CITED

The following references are of record in the file of this patent:

UNITED STATES PATENTS

| Number | Name | Date |
| --- | --- | --- |
| 1,617,094 | Atherton | Feb. 8, 1927 |
| 802,956 | Waterman | Oct. 24, 1905 |
| 802,957 | Waterman | Oct. 24, 1905 |
| 2,031,614 | McKee | Feb. 25, 1936 |
| 2,047,615 | Chadborn | July 14, 1936 |
| 978,706 | Davidson | Dec. 13, 1910 |
| 1,638,325 | Davis | Aug. 9, 1927 |
| 1,990,090 | Packard | Feb. 5, 1935 |
| 2,140,667 | Corsepius | Dec. 20, 1938 |